(12) United States Patent
McEwen

(10) Patent No.: US 8,855,362 B2
(45) Date of Patent: Oct. 7, 2014

(54) INFRA RED DETECTOR SYSTEM AND METHOD

(75) Inventor: Robert K. McEwen, Basildon (GB)

(73) Assignee: Selex ES Ltd, Essex (GB)

( * ) Notice: Subject to any disclaimer, the term of this patent is extended or adjusted under 35 U.S.C. 154(b) by 363 days.

(21) Appl. No.: 12/988,991

(22) PCT Filed: Apr. 23, 2009

(86) PCT No.: PCT/EP2009/054886
§ 371 (c)(1),
(2), (4) Date: Oct. 21, 2010

(87) PCT Pub. No.: WO2009/130275
PCT Pub. Date: Oct. 29, 2009

(65) Prior Publication Data
US 2011/0037855 A1 Feb. 17, 2011

(30) Foreign Application Priority Data
Apr. 24, 2008 (GB) .................................. 0807487.4

(51) Int. Cl.
*H04N 5/33* (2006.01)
*H04N 3/14* (2006.01)
*H04N 5/349* (2011.01)
*G02B 13/14* (2006.01)

(52) U.S. Cl.
CPC .............. *H04N 3/1587* (2013.01); *G02B 13/14* (2013.01); *H04N 5/33* (2013.01); *H04N 5/349* (2013.01)
USPC .......................................... 382/103; 348/164

(58) Field of Classification Search
USPC .......................................... 348/164; 382/103
See application file for complete search history.

(56) References Cited

U.S. PATENT DOCUMENTS

| 5,291,327 | A | * | 3/1994 | McEwen ................... 359/209.1 |
| 5,798,875 | A | * | 8/1998 | Fortin et al. ................. 359/813 |
| 6,034,372 | A | * | 3/2000 | LeVan ........................ 250/352 |
| 2003/0001093 | A1 | | 1/2003 | Wood | |
| 2003/0111534 | A1 | * | 6/2003 | Hillmann ...................... 235/454 |
| 2003/0218801 | A1 | * | 11/2003 | Korniski et al. ............. 359/407 |

FOREIGN PATENT DOCUMENTS

GB          2 250 884 A    6/1992
WO    WO 2007/005721 A    1/2007

OTHER PUBLICATIONS

O. Ocle et al., "QWIP Compact Thermal Imager: Catherine-XP and Its Evaluations", Proceedings of the SPIE, Jan. 1, 2007, pp. 654234-1-654234-12, vol. 6542.*
Office Action dated May 12, 2011, issued in the corresponding European Patent Application No. 09 735 547.3-2220.
International Search Report (PCT/ISA/210) for PCT/EP2009/054886 dated Sep. 15, 2009.

(Continued)

*Primary Examiner* — Sath V Perungavoor
*Assistant Examiner* — Jeffery Williams
(74) *Attorney, Agent, or Firm* — Buchanan Ingersoll & Rooney PC

(57) ABSTRACT

A detector system is described in which an image of a scene is displaced with reference to a dual waveband detector array. Such 'scanning' increases the sampling density, thereby reducing the effective pixel pitch, by moving the image of the scene relative to the detector array by fractions of a pixel pitch in sequential frames. The display is then reconstructed with the data from these frames interleaved relative to the original scan displacement.

9 Claims, 3 Drawing Sheets

- Focal length of MW lens is ~2x LWIR
  - IFOV of MWIR is 0.5x LWIR
  - MWIR range is ~2x LWIR
- f/# of MWIR cold shield is ~2x LWIR
  - Requires variable aperture cold shield and multiple focal length Lens

(56) References Cited

OTHER PUBLICATIONS

Written Opinion (PCT/ISA/237) for PCT/EP2009/054886 dated Sep. 15, 2009.
United Kingdom Search Report for GB 0807487.4 dated Nov. 30, 2008.
O. Cocle et al., "QWIP Compact Thermal Imager: Catherine-XP and Its Evolutions", Proceedings of the SPIE, Jan. 1, 2007, pp. 654234-1-654234-12, vol. 6542.
W. Cabanski et al., "Third Generation Focal Plane Array IR Detection Modules and Applications", Proceedings of the SPIE, Jan. 1, 2005, pp. 340-349, vol. 5783.
P. McManamon et al., "Suggestions for Low Cost Multifunction Sensing", Aerospace Conference, Mar. 21, 1998, pp. 283-307.
J. Wiltse et al., "Imagery Improvements in Staring Infrared Imagers by Employing Subpixel Microscan", Optical Engineering, May 1, 2005, pp. 056401-1-056401-9, vol. 55, No. 5.

* cited by examiner

The Problem: We need ID to engage.
If threat can engage on Detection or Recognition then threat gets first shot even if we have technical advantage.

The Solution: Increase DRI range of Gen. III required to compensate for Asymmetric Rules Of Engagement

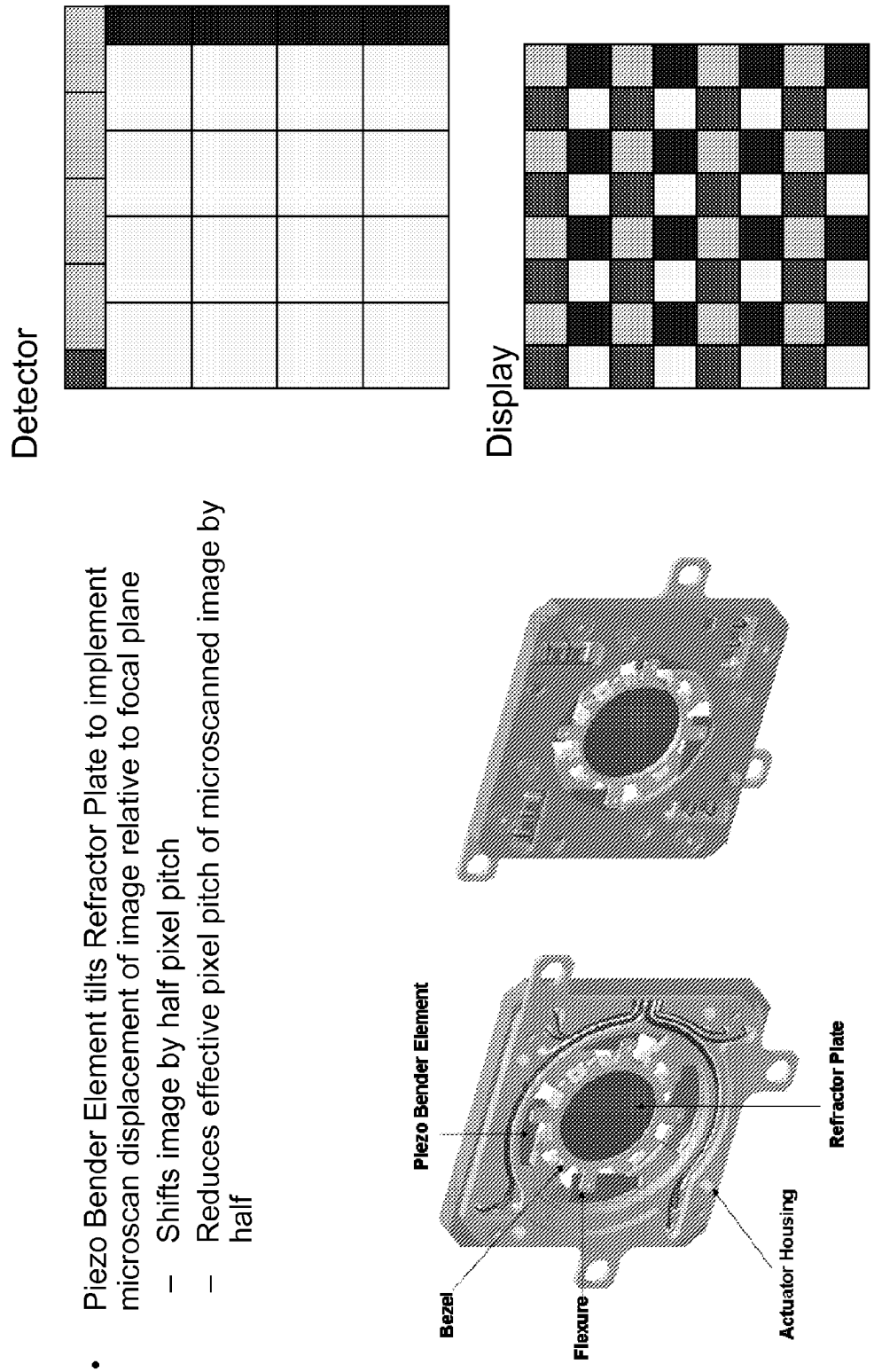

INFRA RED DETECTOR SYSTEM AND METHOD

The invention relates to an Infra Red (IR) detector system and method. More specifically, but not exclusively, the invention relates to a system using microscan technology to facilitate increased range and resolved medium wavelength pixels on target.

In Detection, Recognition, and Identification (DRI) of a target, first you detect something, but its just a blob or a few pixels that are different from background. When you increase magnifcation, or get closer, and when you get around 6 or 7 pixels across the target you can recognise it as, say, a tank as distinct from a truck or a tractor. Then when you have around 13 pixels across the target you can identify it as a specific tank instead of just a tank. Identification is the requirement for our forces to engage a target. Often, the opposition will engage on detection because they know that "anything over there" is worth hitting. Accordingly, DRI is an important factor in engagement and requires an accurate detection system.

There is currently a need in detector technology to place more resolved pixels on targets to improve recognition and identification ranges once a target has been detected. The longest range detection is achieved by optimally matching the detector pitch with the spatial frequency cut-off of the lens. Thus the detector samples the optical image at or close to the Nyquist limit. To increase the number of resolved pixels on the target, for increased recognition range, the wavelength must be reduced, resulting in a higher optical resolution for a given physical aperture. At the reduced wavelength, the optimal system design again optimally matches the detector pitch with the spatial frequency limit of the lens, enabling a longer focal length with a higher focal ratio to be utilised. Hence more resolved pixels are placed on the target by reducing the field of view, and the aim of more pixels on target for increased range achieved.

Current systems are based on 3 technologies:
 1. Dual waveband Focal Plane Arrays (FPAs) operating in the Medium Wave (MW) (3-5 pm) and Long Wave (8-10 pm) bands
 2. Variable cold apertures (f/3 to f/6.5)
 3. Variable focal length telescopes.

These technologies work together to achieve increased object space resolution in the MW channel compared to the LW channel of the dual waveband detector, through the same system aperture. The sensor is designed with a defined physical optical aperture and the focal length of the optic designed for maximum utilisation of that aperture in the LW band. The maximum recognition and identification range of the LW sensor is restricted by the diffraction limits of the optical aperture, defining the maximum useful focal length and, in turn, the maximum relative aperture, f/#, of the lens. increased recognition and identification ranges can be achieved using the same physical aperture in the MW band. Since the MW and LW pixels are the same size and pitch in a dual-band detector, this higher diffraction limited resolution requires a longer focal length, and thus a larger relative aperture, or f/#.

For infrared sensors, it is essential that the cold stop efficiently matches the relative aperture of the lens. Thus, when operating in the LW band the variable cold aperture is at, say, f/3.5. However, to realise the increased resolution and extended range capability of the MW band, the focal length of the lens is almost doubled and the variable cold aperture must be increased to f/6.5 to maintain compatibility with the same physical optical aperture.

In summary, in a known system:
Maximum DRI range is determined by diffraction limit of the optical aperture available on the system.
 Minimum resolved angle, $\theta=1.22\times A/D$, where D is diameter of optical aperture
 Theoretical angular resolution is approximately twice as high in MWIR (3-5 pm) as it is in LWIR (8-12 pm) for a common aperture
Maximum range when the pixel instantaneous field of view (IFoV) equals the minimum resolved angle $$P/F=e=1.22\times A/D$$

$F=1.22\times A/(D\times P)$
$P=1.22\times\backslash\times F/D=1.22\times A\times f/\#$
$f/\#=P/(1.22\times A)$ Hence maximum range in MWIR requires approximately twice the focal length and f/# for common aperture and pixel size
 Cold aperture required in thermal band to eliminate thermal emissions from aperture
 Cold aperture must have variable size to achieve maximum ranges
There are several disadvantages of this approach including:
 Complex cryogenic mechanisms for variable aperture
 Complex multi-Field of View (FoV) lens with different channels for each waveband
 Time to switch between MW & LW channels constrained by speed of mechanics
 MW performance compromised by reduced photon flux through higher f/#, resulting in longer stare times and higher relative contribution of stray light, known as photon starvation.

Microscan is an alternative approach with dual band detectors which avoids all of these disadvantages whilst still facilitating increased range and resolved MW pixels on target, in a much lower cost solution.

According to the invention, there is provided an infra red detector system comprising a dual waveband detector capable of being scanned such that an image of a target is moved by portion of a pixel pitch in sequential frames in the x-y axes, resulting in an increase in the sampling density, or an effective reduction of the detector pitch.

In this way, the resolution of the MWIR is increased with respect to the LWIR.

According to the invention there is further provided a method of detecting a target in which an image of a scene is moved relative to a detector array by fractions of a pixel pitch in sequential frames, the display subsequently being reconstructed with the data from these frames interleaved relative to the original scene displacement.

In this way, the spatial resolution is increased and hence recognition and identification range improved, by using the microscan with the MWIR channel over what can be achieved through the same aperture in the LWIR channel. Accordingly, this is different from the existing approach of optical magnification requiring variable cold stops.

The invention will now be described with reference to the accompanying diagrammatic drawings in which;

FIG. 3 is a schematic representation showing the operation of microscan technology, namely displacement of the image relative to the focal plane of the detector.

Figure 1:
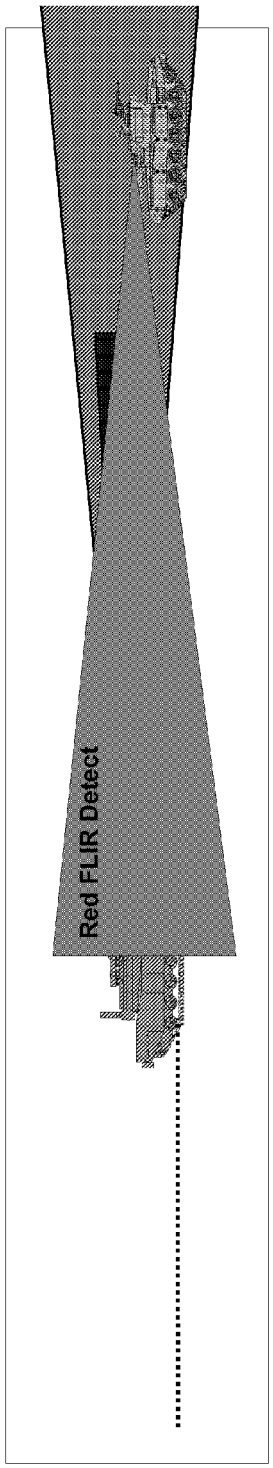
FIG. 1 is a schematic representation of the problem associated with detection and recognition of a target in a scene.
Figure 1:
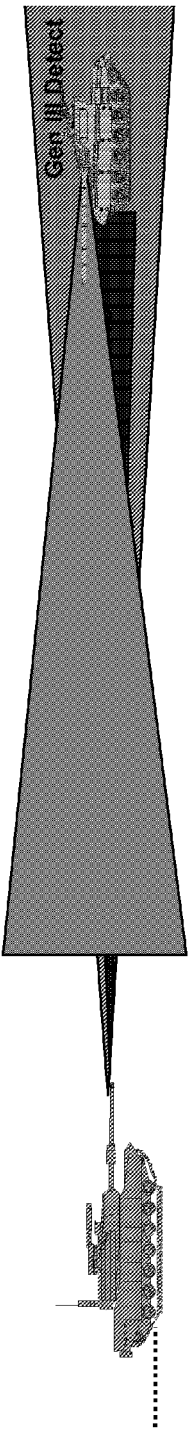
Figure 2:
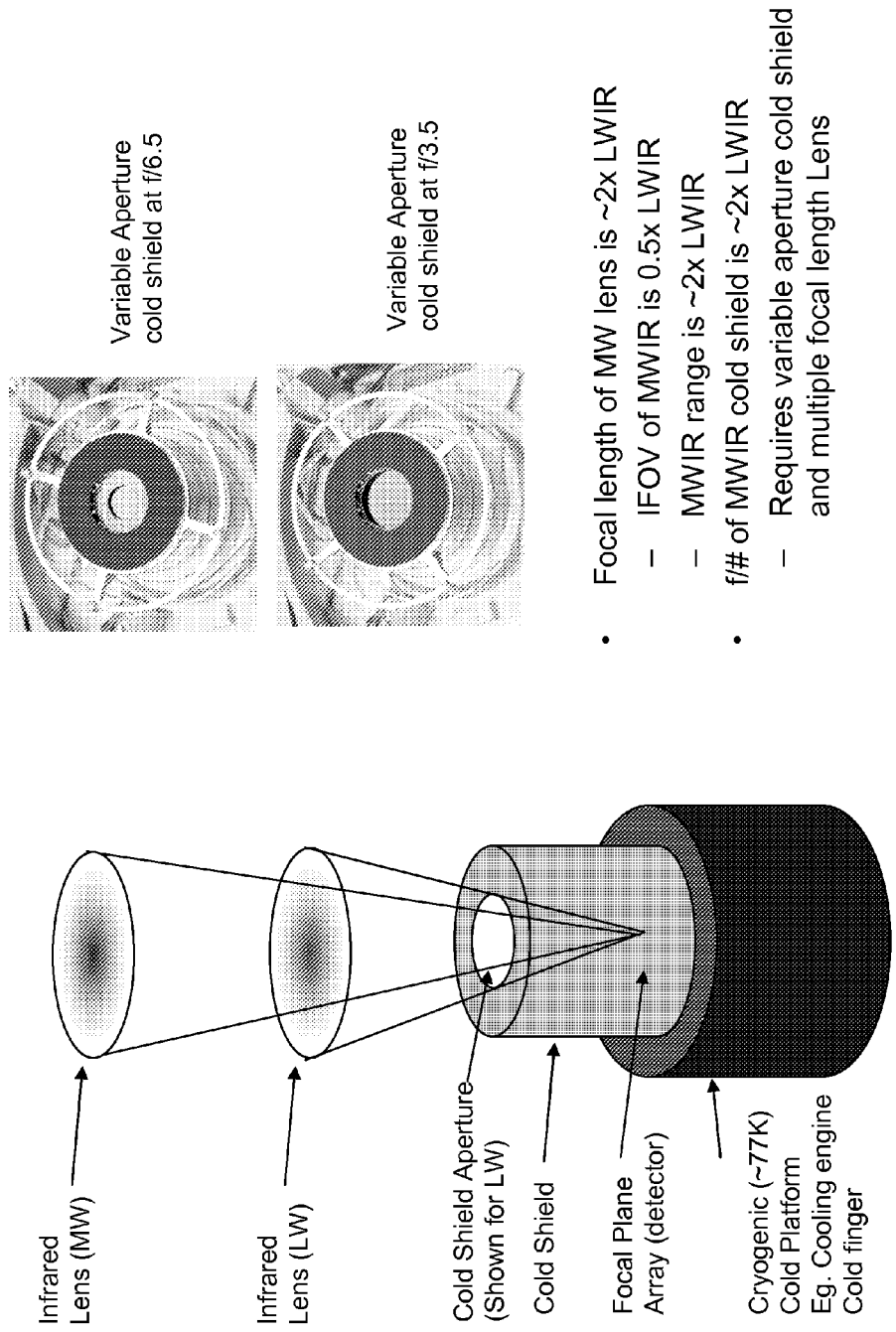
FIG. 2 is a schematic representation of a typical detector encapsulation.

Microscan increases the sampling density, reducing the effective pixel pitch, by moving the image of the scene relative to the detector array by fractions of a pixel pitch in sequential frames and then reconstructing a display with the data from these frames interleaved relative to the original microscan displacement. In its simplest form, microscan moves the image by half a pixel pitch in sequential frames in the x-y axes, resulting in a doubling of the sampling density, or an effective halving of the detector pitch, known as 2× microscan.

Numerous methods of achieving the necessary microscan displacement have been developed, including optical prisms and spinning wheels. A simple solution for 2×2 microscan is a plane parallel refractive plate in the convergent light space of the sensor. This is tilted by small angles using piezo-electric transducers, such that the optical axis is shifted by half a pixel pitch between the two angular positions. The exact tilt angle can be precisely defined using "end stops" to the mechanical travel. Such a solution is extremely low cost, typically less than 10% of the cost of the dual band focal plane, even in small quantities.

As with the original approach, the maximum recognition and identification range of the LW band are restricted by the diffraction limits of the physical aperture, defining the maximum useful focal length and f/# in the LW band. In this situation, the LW channel samples the image close to the Nyquist limit of the optical image, while the MW channel is under-sampled (the optical diffraction blur is much smaller than the pixel size) since the MW channel of the dual band detector has exactly the same pixel size as the LW channel.

For the condition where the LW diffraction limit imposed by the physical optical aperture is fully utilised by the LW channel (8-10 pm) of the dual band detector, a 2× microscan system ensures that the MW diffraction limit of the same physical aperture is fully utilised by the MW channel (3-5 pm) of the same detector. The result is that the MW channel is now optimally sampled for the existing aperture and focal length and more resolved pixels are placed on the target.

Using microscan with the dual waveband detector, the cold stop remains unchanged whether operating in the MW or LW channel at maximum range, so no complex cryogenic opto-mechanical systems are required. The microscan can be switched on and off instantly—indeed it can operate continuously if required. Resolved pixels on target are increased without changing the FoV of the lens, resulting in simplified lens configurations. Finally, the MWIR channel provides increased spatial resolution without approaching the photon starved conditions of an f/6.5 system.

In addition to the immediate practical benefits of the microscan dual waveband solution over the existing variable aperture system approach, there are several system benefits which can be exploited. The extended range is achieved without changing the field of view between the MW and LW channels of the dual waveband detector. As a result, the MW and LW pixels remain spatially coherent in the two images, which simplifies fusion algorithms between the two bands. Such band fusion techniques can be used to improve the ability to distinguish synthetic from natural objects. The effect of microscan on dual waveband detector systems can be summarised as follows:

Microscan reduces effective pixel pitch, P, by half.
No significant advantage in LWIR channel because this is optimised to full optical aperture by initial selection of lens focal length
In MWIR, diffraction limit of lens aperture is twice as high
Reduction in pixel pitch reduces MWIR IFoV by 2×
Increase in Recognition and Identification range It will be appreciated that the invention as described above, with reference to the appended diagrams, is one embodiment of the invention only and it will be appreciated that the specific example described is for example only. It will further be appreciated that the lens configurations, aperture sizes and f#, wavelengths and detector characteristics described are for example only and any suitable lens configurations, aperture sizes and f#, wavelengths and detector characteristics may be used.

The invention claimed is:

1. An infra red detector system comprising:
a dual waveband detector having a medium wave (MW) channel, a long wave (LW) channel, and an aperture of a predetermined size, wherein the LW channel and the MW channel have the same pixel size and the size of the aperture imposes an LW diffraction limit on the LW channel of the detector, the dual waveband detector being configured to scan the MW channel such that an image of a target is moved by a portion of a pixel pitch in sequence, said scanning providing an increase in sampling density of the MW channel to ensure that the MW diffraction limit of the aperture is fully utilized by the MW channel in the detector such that more resolved pixels are placed on the target, and said scanning being configured for continuous operation,
wherein the dual waveband detector is configured to sample the image in the LW channel at a rate close to a Nyquist limit of the image and under-sample the image in the MW channel.

2. The system according to claim 1, comprising:
optical prism means, spinning wheel means or a plane parallel refractive plate in a convergent light space of the detector for displacement of the image of the target.

3. The system according to claim 2, in which the plane parallel refractive plate is tilted by small angles using piezo-electric transducers, such that an optical axis is shifted by half a pixel pitch between two angular positions.

4. The system according to claim 3, in which the exact tilt angle precisely defined using end stops to mechanical travel.

5. The detector system of claim 1, wherein the dual band detector is configured for turning a scan on and off instantly.

6. A method of detecting a target using a dual band (MW) and detector having medium wave (MW) and long wave (LW) channels and a fixed predetermined aperture size, the method comprising:
imaging the target from a continuous scan of a scene using the LW channel of the detector;
displacing the image of the target relative to the detector by a portion of a pixel pitch in the MW channel of the detector only;
sampling the image in the LW channel at a rate close to a Nyquist limit of the image;
under-sampling the image in the MW channel; and
reconstructing the image with data from both the LW and MW channels by interleaving data relative to the original scene displacement thereby ensuring that for the given aperture size, both the diffraction limits of the LW and MW channels are fully utilized.

7. The method according to claim 6, comprising:
displacing the image of the target involves using optical prism means, spinning wheel means or a plane parallel refractive plate in a convergent light space of the detector.

8. The method according to claim 7, comprising:
tilting the plane parallel refractive plate by small angles using piezo-electric transducers, such that an optical axis is shifted by half a pixel pitch between two angular positions.

9. The method according to claim 8, comprising:
defining the tilt angle using end stops to mechanical travel.

* * * * *